April 1, 1969  C. C. SEGER ET AL  3,436,039
AIRCRAFT PRESSURIZATION OUTFLOW VALVE
Filed April 24, 1967
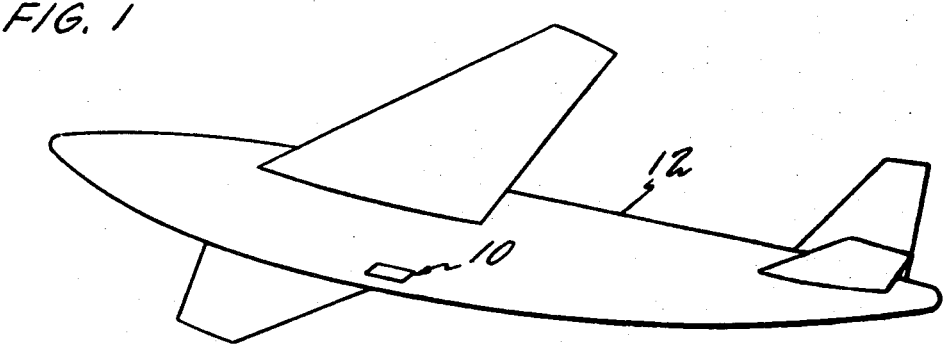
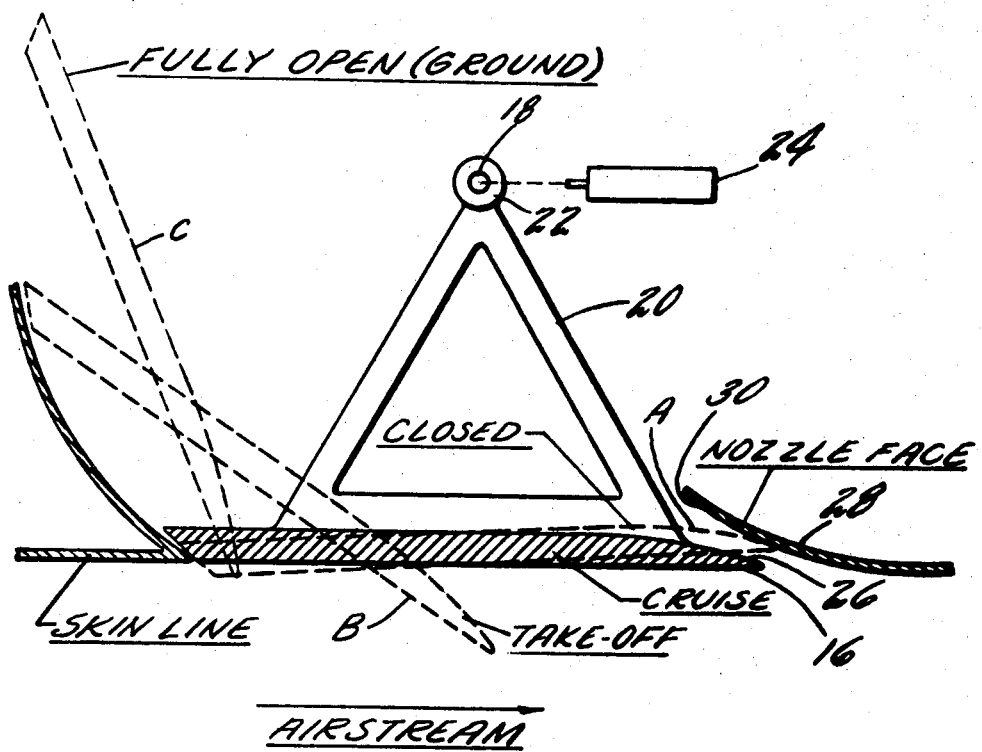
INVENTORS
CHARLES C. SEGER
FLOYD R. EMMONS
BY Norman Friedland
ATTORNEY United States Patent Office 3,436,039
Patented Apr. 1, 1969

3,436,039
AIRCRAFT PRESSURIZATION OUTFLOW VALVE
Charles C. Seger, West Suffield, and Floyd R. Emmons, Granby, Conn., assignors to United Aircraft Corporation, East Hartford, Conn., a corporation of Delaware
Filed Apr. 24, 1967, Ser. No. 633,138
Int. Cl. B64d *13/04;* B64c *1/14, 23/00*
U.S. Cl. 244—129                                 4 Claims

ABSTRACT OF THE DISCLOSURE

A flat plate-like valve element is pivotally mounted to be flush with the skin of the aircraft and serves as a variable area throttling valve to maintain the pressure in the cabin of the aircraft at a predetermined value. The side wall defining the opening in the skin together with the valve element defines a thrust nozzle in a given position and a shield to prevent "take-off bump" in another position.

Cross-references to related applications

This application is directed to subject matter disclosed in an application entitled "Aircraft Pressurization Outflow Valve" by F. Emmons filed on the same date and assigned to the same assignee.

Background of the invention

This invention relates to cabin pressure regulators and particularly to the outflow valve adapted to discharge fluid from the cabin in accordance with a schedule for maintaining the cabin pressure at a predetermined level.

As is generally well recognized, the cabin pressure regulating outflow valve is generally constructed as a poppet type valve and merely serves to discharge cabin air in accordance with a predetermined schedule. While there are other types of valves that have been considered and utilized in this area, such valves have been designed with the provision of providing thrust recovery to augment the thrust of the aircraft propulsion system by discharging the cabin air in a predetermined manner. Although these devices have been satisfactory in certain applications, the problem incident with the interaction between the discharging air and slipstream has been prevalent particularly during take-off. The interaction of the slipstream moving past the discharge opening caused a ram pressure rise and a consequent lowering of the pressure drop across the outflow valve. The problem becomes even greater aggravated on rotation of the valve element when the angle of attack is increased and the ram pressure rises further.

We have found that we can obviate this problem by providing a gate-type valve that is normally mounted flush against the skin of the aircraft when in the closed position but projects a substantial amount beyond the skin of the aircraft so as to act as a shield to deflect the slip-stream away from the discharging air, hereinafter referred to as ram shielding. This mode of operation is only desirable during take-off as in any other mode it would result in a drag which is undesirable. Thus the ram pressure rise then occurs on the front of the gate rather than at the point where the flow leaves the skin line. Additionally, the valve can be made to cooperate with the discharging port so as to form a thrust nozzle when the aircraft is in the normal cruise position.

Summary of invention

The primary object of the invention is to provide an improved outflow valve for an aircraft cabin pressure regulating system.

In accordance with the present invention a flat plate-type valve element is pivotally mounted flush to the skin of the aircraft and is positioned so that it projects beyond the skin in order to provide ram shielding and further positioned to cooperate with the discharge port to form a thrust recovery nozzle.

A still further object of this invention is to place the axis of rotation at a point which is centered over the opening such that the pressure force is exerted almost through the pivot which effectively minimizes the actuation forces.

A still further object is to provide an outflow valve for aircraft that is characterized as being simple to manufacture, economical, and capable of rugged use.

Other features and advantages will be apparent from the specification and claims and from the accompanying drawings which illustrate an embodiment of the invention.

Brief description of the drawing

FIGURE 1 is a schematic illustration of an aircraft wherein the valve is mounted on the underbody of the fuselage;

FIGURE 2 is a view, partly in elevation, partly in schematic and partly in section illustrating the details of the invention.

Description of the preferred embodiment

Reference is now made to FIGS. 1 and 2 wherein the outflow valve generally illustrated by numeral 10 is pivotally mounted to cover an opening formed in the skin of the aircraft generally illustrated by numeral 12. It will be appreciated that in the cruise position, as illustrated in FIG. 1, the valve element is flush with the skin and does not interfere with the slipstream passing adjacent thereto. The opening in the skin is in communication with the cabin for discharging the cabin air therefrom in order to maintain the pressure level at a predetermined value. A description of the mechanism for controlling outflow valve 10 is not included herein for the sake of simplicity and convenience but for further details of suitable mechanism, reference should be made to U.S. application Ser. No. 564,114, filed July 11, 1966 by F. Emmons.

As can be seen from FIGURE 2, the flat plate-like valve element 16 is pivotally supported about axis 18 by arms 20 which extend between valve element 16 and boss 22, the boss being fixed to shaft 18. An actuator, schematically illustrated by box 24, serves to rotate the unit in response to the cabin pressure regulator control system, not shown. It will be noted that the right-hand top surface of valve element 26 is slightly convex and the skin of the aircraft 28 adjacent thereto is slightly bent to extend inwardly toward the cabin and it likewise is convex for defining therewith a converging or slightly diverging thrust nozzle when the valve element 16 assumes the position shown. Thus, the air discharging to atmosphere augments this forward thrust of the aircraft recovering the thrust that would otherwise be produced by the engine if not expanded for the pressurization system—otherwise referred to as thrust recovery. It will be noted that in the closed position, illustrated by reference letter A, the valve element 16 bears against the skin 28 at either end for substantially blocking off the flow.

During take-off it is desirous to allow the cabin air to flow from the cabin into the slipstream undisturbed. The airstream adjacent opening 30 interacts with the discharging air and effectually increases the pressure at the opening and interrupts the flow from the cabin. This is known as a "take-off bump" and can cause uncomfort to the passengers in the aircraft. To obviate this problem the valve element 16 is rotated to assume a position illustrated by reference letter B wherein it projects into the airstream to shield the airstream from the discharge port. Thus, as the air adjacent the upstream end of valve 10 impinges on the bottom face of element 16, it is diverted in a downward direction away from the discharge port preventing the interaction between the discharge air and the airstream.

In the full open position the valve element 16 is further rotated in the position shown by reference letter C wherein it is substantially retracted into the cabin.

It should be understood that the invention is not limited to the particular embodiments shown and described herein, but that various changes and modifications may be made without departing from the spirit or scope of this novel concept.

We claim:
1. An outflow valve for an aircraft cabin for maintaining the pressure in the cabin at a predetermined pressure by regulating the flow discharging from the cabin and which airplane operates over a take-off and cruise mode comprising:
   movable valve means mounted flush with the skin of the aircraft when in its cruise mode for varying an opening formed therein and movable to an opened and closed position, a ram shield position during said takeoff mode and a thrust recovery position when in said cruise mode, said valve means having a pivot internally of the aircraft, said pivot being in a plane normal to said opening and the longitudinal axis of the aircraft,
   said valve means being substantially completely retractable within the interior space adjacent the skin of the aircraft.
2. An outflow valve as claimed in claim 1 wherein said movable valve means include a valve element having its axis of rotation lying in a plane in coincidence with a plane normal to the opening.

3. An outflow valve as claimed in claim 1 wherein the skin of said aircraft adjacent said opening and said outflow valve define a thrust nozzle.

4. An outflow valve for an aircraft operable over a take-off and cruise mode having a cabin for maintaining the pressure in the cabin at a predetermined value by regulating the flow of air discharging from the cabin and including, in combination:
   valve means, including a plate-like valve element, movable to a closed and opened position,
   said plate-like element lying flush with the skin of the aircraft adjacent thereto when in the cruise mode,
   means for imparting movement to said plate-like element so that a substantial portion thereof projects into the slipstream for diverting the slipstream away from said opening when in the take-off mode,
   said plate-like element being retractable within the interior of the aircraft when in said opened position, and
   a contoured surface formed on one end of said plate-like element defining with said skin a thrust nozzle when valve means is in a position intermediate said closed and full opened position.

References Cited

UNITED STATES PATENTS

| 1,562,663 | 11/1925 | Strong | 98—1.5 |
| Re. 23,536 | 8/1952 | Del Mar | 98—1.5 |
| 3,330,500 | 7/1967 | Winborn | 244—12 |

FOREIGN PATENTS

| 603,203 | 6/1948 | Great Britain. |

MILTON BUCHLER, *Primary Examiner.*

J. E. PITTENGER, *Assistant Examiner.*